J. A. REY.
ELECTRICAL CONTROL APPARATUS.
APPLICATION FILED DEC. 2, 1909.
1,086,729.
Patented Feb. 10, 1914.
2 SHEETS—SHEET 1.
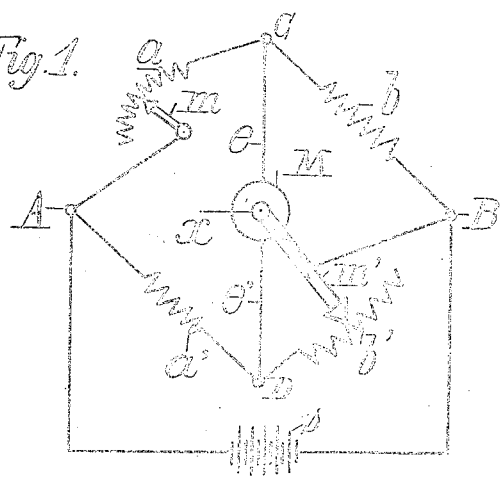
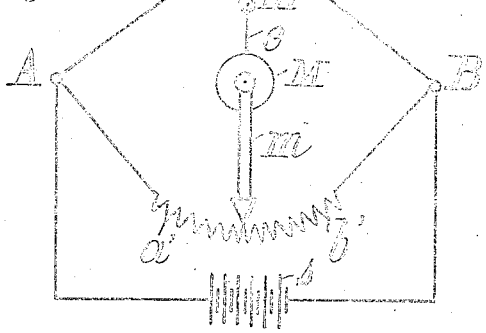
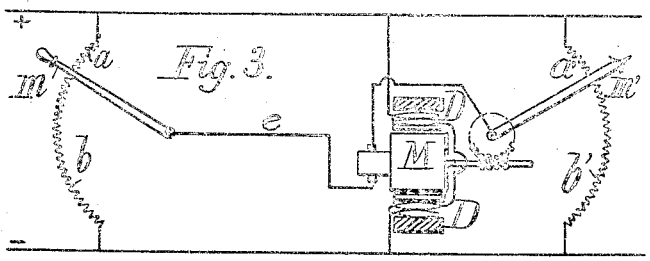

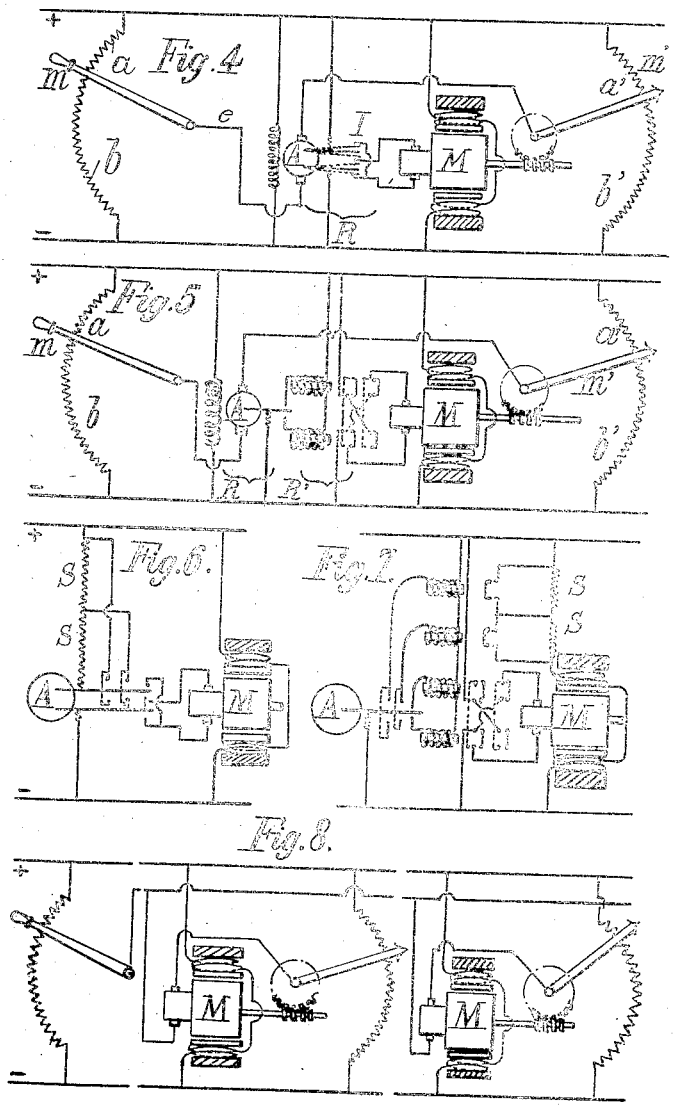

UNITED STATES PATENT OFFICE.

JEAN ALEXANDRE REY, OF PARIS, FRANCE.

ELECTRICAL CONTROL APPARATUS.

1,086,729. Specification of Letters Patent. Patented Feb. 10, 1914.

Application filed December 2, 1909. Serial No. 531,021.

*To all whom it may concern:*

Be it known that I, JEAN ALEXANDRE REY, of 26 Avenue de Suffren, Paris, France, engineer, have invented a new and useful Improvement in Electrical Control Apparatus, which improvement is fully set forth in the following specification.

It is often necessary to control from a distance the movement of one or more members, for example a signal, a ship's telegraph, an electric contact maker, a train having multiple units, a light projector. In general for each position of the control handle there is a corresponding position for the member controlled. Mere mechanical connection may insure the correctness of this movement; but a mere mechanical connection is no longer sufficient when great power is required to move the member or members or again when such member or members are at a distance from the control station. In this case several means are employed especially electrical means.

This invention has for its object the electrical control of one of more movements, in which the parts are simple and in which a very small number of electric wires is used to connect the control station to the member or members controlled.

According to this invention each member or group of members controlled is operated by means of a suitable electrically actuated device interpolated in the bridging wire of an electric system identical with or equivalent in principle to a Wheatstone bridge whose balance is broken by altering at the control station the relation between the resistances in two of the bridge arms. The current caused to flow by this means actuates the device until such time as the relation between the resistances of the other two arms of the bridge has been altered at the controlled station to correspond to that between the resistances of the first pair of arms, that is to say, until the balance of the bridge has been restored. Thus the amplitude of movement of the device and consequently of the member controlled corresponds to the extent to which the balance is altered at the control station. Owing to its great simplicity, this system may easily be adapted to transmit a mixed movement which comprises for example a horizontal movement combined with an independent vertical movement such as is required for pointing a projector of light in a horizontal and in a vertical plane.

In the accompanying drawings: Figures 1 and 2 are diagrams representing the principle involved in carrying out my invention; Fig. 3 shows diagrammatically a system embodying said invention; Figs. 4, 5, 6 and 7 show also diagrammatically modifications thereof; Fig. 8 is a diagrammatic view showing the systems of Fig. 3 applied to multiple trains.

The usual elements of an ordinary Wheatstone bridge will be seen, viz: The arms formed of the resistances $a$ $a'$, $b$ $b'$, meeting at the points A B C D; and the bridging wire $e$; a device M which may be a galvanometer, electric motor, capable of turning upon its axis $x$ in either direction according to the direction of the current which passes through the wire $e$, and a source of electricity $s$. The arrangement further comprises: At the control station a contact $m$ moving over the resistance $a$ for the purpose of varying such resistance. At the controlled station a contact $m'$ moved by the motor device M over the resistance $b'$ which it can control. The controlled member $m'$ is actuated by the device M in any convenient manner. The other elements forming the bridge, that is the resistances $a'$ and $b'$ and the source of electricity $s$ may be placed in any suitable position at the control station, the controlled station or elsewhere. By moving the contact $m$ a predetermined extent and thus breaking the balance of the bridge, a current will pass through the wire $e$ until the motor device M which is then actuated has by the movement of the contact $m'$ reëstablished the balance of the bridge. The amplitude of the movement of $m'$, and consequently of the motor and with it of the member controlled will therefore be a function of the movement of $m$. It may be remarked that the contact $m'$ in place of altering the value of the resistance $b'$ might also equally well affect that of $b$. Fig. 2 shows diagrammatically an equivalent arrangement in which the two resistances $a'$ and $b'$ vary equally in opposite senses and are both at the controlled station; the source of electricity $s$ may be in any locality.

In practice the system may for example be carried out as shown diagrammatically in Fig. 3 of the drawings. The device is here an electric motor whose armature is coupled in the bridging wire *e* and whose field coil D is in shunt with the source of electricity represented only by the + and − conductors. The movement of the contact *m'* is caused through the intermediary of a worm and a helicoidal toothed wheel. It may happen that the movements of the member controlled require an expenditure of energy greater than that which can be furnished by the bridge current above mentioned. In this case as indicated in Fig. 4 such current is caused to act upon a reversing relay R which establishes contacts for putting a main motor M in action; this reversing relay is shown in the form of a small auxiliary motor whose armature A can oscillate between two extreme positions and is brought by a spring back to a mid position. This armature is fast with the reverser I. When the current in the bridging wire flows through the armature A, it turns through a certain angle in one direction or the other, putting the main motor M in motion in one direction or the other. The principle of working remains the same as before. If current is flowing in the bridging wire of the Wheatstone bridge, the motor M moves in one direction or the other, according to the direction of the current in such wire. This motor comes to rest so soon as current no longer flows through the bridging wire. When the resistances *a b*, *a' b'*, comprise a large number of contacts, the energy transmitted by the bridging wire may, if necessary, be very small compared with that absorbed by the resistances. It is advantageous in this case in order to obtain great sensitiveness of the system to utilize as reversing relay R an apparatus capable of being placed in movement by very small currents, for example certain reversing relays employed in telegraphy, or a galvanometer. If the contacts made by this reverser R are too delicate to pass a current necessary for the motor M, they may control intermediate relays R' which establish the circuit for the motor M, as shown in the diagrammatic Fig. 5. The controlling relay such as is shown in Figs. 4 and 5 only gives to the motor M a single rate of speed in one direction or the other. If it be desired to have several rates of speed greater or less according as the contacts *m* or *m'* are farther from or nearer to the position in which there is a balance, there may be arranged on each side of the reversing relay R several contacts which are successively made. Each of these controls, directly in Fig. 6 or by a relay in Fig. 7, the putting into or out of circuit of resistances S which modify the rate of speed of the motor M.

The system above described, that is to say, the application of the Wheatstone bridge to the electric control of two or more movements lends itself advantageously, as above mentioned, to the control from a distance of mixed movements such as are necessary for example when controlling at a distance a projector of light in direction and elevation. In this application the control station may consist of a telescope mounted on a circle after the manner of a theodolite provided with horizontal and vertical circles. At the controlled station, the projector will be mounted in the same manner upon horizontal and vertical circles; the divisions of the two horizontal circles, 400 in number for example, will be replaced by 400 contacts connected to 400 points of the resistances *a b* and *a' b'* above described. The motor M which insures the movement of the projector in a horizontal plane, will be put into circuit as described for Figs. 3, 4, 5, 6 or 7 with or without the use of relays R and R'. The divisions of the two vertical circles to the number of 20 for example arranged upon the useful portion of their circumference will also be replaced by 20 contacts connected to 20 points of two other resistances; another motor controlling the inclination or vertical angle of the projector will be placed in circuit with these two other resistances as described for Figs. 3, 4, 5, 6 or 7. The control of horizontal and vertical movements may be insured by two similar but independent circuits comprising two separate motors. These two motors may of course utilize the same positive and negative current distributing cables. The different elements of the combination are preferably arranged in such a manner that the control keeps the projector parallel to the control telescope in a horizontal and a vertical sense.

In Fig. 8 is shown the manner in which the arrangement shown in Fig. 3 allows the control of several movable members by means of a single moving contact. This figure only shows two controlled members but it is evident that the same system can be adapted without difficulty to a large number of controlled stations. The motors M arranged in parallel are controlled in a manner identical with that described with reference to Fig. 3, a single moving contact being sufficient to actuate simultaneously all the motors. One or more of these motors M may also comprise one of the relay arrangements indicated in Figs. 4, 5, 6 or 7 or any other system of equivalent relay. In the application to multiple unit trains each of the members controlled may consist of the moving contact of the contact maker at the electrical motor carrier which may be of any suitable type. In this manner a single general control contact insures simultaneously the suitable movement of any number of contact arms each of which belongs to one of the electrical motor carriers arranged along the train.

Claims.

1. In control apparatus, a resistance at the control station and a resistance at the controlled station, a bridging wire, a contact traveler connected to the bridging wire at the control station and adapted to contact with the control resistance, a second contact traveler connected to the bridging wire at the controlled station and adapted to contact with the controlled resistance and a main motor included in the main circuit and connected with the second traveler, in combination with an auxiliary motor, and a series of resistances adapted to be successively thrown into circuit with the main motor.

2. In a control apparatus, a resistance at the control-station and at a controlled station, in combination with a bridging wire connecting the resistance at the control-station with the resistance at the controlled station, a motor controlled by the current passing between the resistance at the control station and the resistance at the controlled station, a traveler for restoring the equilibrium of the bridging wire, a series of resistances for the motor, and means for throwing them into circuit with said motor.

3. In control apparatus, a resistance at the control-station, a controlled station and a resistance at the same, in combination with a bridging wire connecting the resistance at the control-station with the resistance at the controlled station, a motor controlled by the current passing in the bridging wire, a traveler actuated by the motor for restoring the equilibrium of the bridging wire, a relay at the controlled station for controlling the circuit of the motor at the controlled station, and a series of resistances for the motor adapted to be thrown into circuit with said motor.

4. In control apparatus, a resistance at the control-station, a controlled station and a resistance therefor, in combination with a single bridging wire connecting the resistances at the control and the controlled station, a main motor located at the controlled station and controlled by the current passing in the bridging wire, a traveler for restoring the equilibrium of the bridging wire actuated by the said main motor, an auxiliary motor on the bridging wire at the controlled station, and a series of resistances adapted to be thrown into circuit with the main motor.

5. In a control apparatus, a resistance at the control-station and at a controlled station, in combination with a bridging wire connecting the resistance at the control-station with the resistance at the controlled station, an auxiliary motor connected to the resistances at the control-station, a main motor controlled by the current passing in the bridging wire through the auxiliary motor, and a traveler for restoring the equilibrium of the bridging wire, a series of resistances for the main motor, and means for throwing them into circuit with the said main motor.

6. In control apparatus, a resistance at the control station, a plurality of controlled stations and a resistance at each of the controlled stations, in combination with a single bridging wire leading from the resistance at the control station and connections between the said bridging wire and the resistance at the controlled stations, means for disturbing the balance of the bridge at the control station, means on the bridge wire at each controlled station for reestablishing the balance of the bridge wire, and a series of resistances adapted to be thrown into circuit with the last mentioned means.

7. In control apparatus, a resistance at the control station, a plurality of controlled stations and a resistance at each station, in combination with a single bridging wire leading from the resistance at the control station and connections between the said bridging wire and each of the resistances at the controlled stations, a motor controlled by the current passing in the bridging wire at each controlled station and actuating a traveler for restoring the equilibrium of the bridging wire and a series of resistances for each motor and means for throwing them into circuit with said motor.

8. In control apparatus, a resistance at the control station, a plurality of controlled stations and a resistance at each station, in combination with a single bridging wire leading from the resistance at the control station and connections between the said bridging wire and each of the resistances at the controlled stations, a motor connected to the bridging wire at each controlled station and actuating a traveler for restoring the equilibrium of the bridging wire, a relay at each controlled station for controlling the circuit of the motor at the station and a series of resistances for each motor adapted to be thrown into circuit with said motor.

9. In control apparatus, a resistance at the control station, a plurality of controlled stations and a resistance at each station, in combination with a single bridging wire leading from the resistance at the control station and connections between the said bridging wire and each of the resistances at the controlled stations, a main motor connected to the bridging wire at each controlled station and actuating a traveler for restoring the equilibrium of the bridging wire, an auxiliary motor at a controlled station and a series of resistances adapted to be thrown into circuit with the main motor.

10. In control apparatus, a resistance at the control station and a resistance at the controlled station, a bridging wire, a contact traveler connected to the bridging wire at the control station and adapted to contact with the control resistance, a second contact traveler connected to the bridging wire at the controlled station and adapted to contact with the controlled resistance and a main motor included in the main circuit and connected with the second traveler, in combination with an auxiliary motor, and a resistance adapted to be thrown into circuit with the main motor.

In testimony whereof I have signed this specification in the presence of two subscribing witnesses.

JEAN ALEXANDRE REY.

Witnesses:
 DEAN B. MASON,
 FREDERIC HARLÉ.